(12) United States Patent
Seward, III

(10) Patent No.: US 6,205,818 B1
(45) Date of Patent: Mar. 27, 2001

(54) PRODUCTION OF FUSED SILICA HAVING HIGH RESISTANCE TO OPTICAL DAMAGE

(75) Inventor: Thomas P. Seward, III, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/202,477

(22) PCT Filed: Jul. 1, 1997

(86) PCT No.: PCT/US97/11697

§ 371 Date: Dec. 14, 1998

§ 102(e) Date: Dec. 14, 1998

(87) PCT Pub. No.: WO98/07053

PCT Pub. Date: Feb. 19, 1998

Related U.S. Application Data

(60) Provisional application No. 60/022,815, filed on Jul. 26, 1996.

(51) Int. Cl.[7] .................................................. C03B 27/012
(52) U.S. Cl. ........................ 65/33.2; 65/17.6; 204/157.41; 204/157.44
(58) Field of Search .................................... 65/17.4, 17.5, 65/17.6, 30.1, 30.12, 32.1, 33.2; 501/54, 900, 905; 204/157.41, 157.44

(56) References Cited

U.S. PATENT DOCUMENTS

| | | | |
|---|---|---|---|
| 4,789,389 | * | 12/1988 | Schermerhorn et al. ............... 65/390 |
| 4,857,092 | * | 8/1989 | Meerman ............................... 65/427 |
| 4,961,767 | * | 10/1990 | Schermerhorn et al. ............... 65/427 |
| 5,086,352 | * | 2/1992 | Yamagata et al. .................... 359/350 |
| 5,410,428 | * | 4/1995 | Yamagata et al. .................... 359/350 |
| 5,547,482 | * | 8/1996 | Chalk et al. ........................... 65/17.2 |
| 5,616,159 | * | 4/1997 | Araujo et al. .......................... 65/17.4 |

FOREIGN PATENT DOCUMENTS

| | | | |
|---|---|---|---|
| 0 483 752A | 5/1992 | (EP) | ................................. C03C/4/00 |
| 0 636 586A | 2/1995 | (EP) | ................................. C03C/3/06 |

OTHER PUBLICATIONS

Naouki Kitamura et al., *Refractive Index of Densified Silica Glass*, Journal of Non–Crystalline Solids, NL, North Holland Physics Publishing, Amsterdam, vol. 159, No. 3, Jul. 1993, pp. 421–245.

Shelby, JE, *Radiation Effects In Hydrogen–Impregnated Vitreous Silica*, Journal of Applied Physics, vol. 50, No. 5, May 1979, pp. 3702–3706.

* cited by examiner

*Primary Examiner*—Sean Vincent
(74) *Attorney, Agent, or Firm*—Edward F. Murphy

(57) ABSTRACT

A method of rendering fused silica resistant to compaction caused by UV laser beam irradiation. The method of the invention results in a fused silica member that is desensitized to compaction caused by the long-term exposure to UV laser beams. The invention includes a means to pre-compact fused silica members using high energy radiation.

8 Claims, 9 Drawing Sheets

PRODUCTION OF FUSED SILICA HAVING HIGH RESISTANCE TO OPTICAL DAMAGE

This application claims the benefit of U.S. Provisional Application Ser. No. 60/022,815, filed Jul. 26, 1996, entitled Method of Rendering Fused Silica Resistant to Compaction.

BACKGROUND OF THE INVENTION

This present invention relates to fused silica optical members and a method of rendering the optical members resistant to compaction caused by prolonged exposure to ultraviolet laser beams.

As the energy and power output of lasers increase, the optics such as lenses, prisms, and windows which are used in conjunction with such lasers are exposed to increased irradiation levels and energies. Because of fused silica's excellent optical properties, fused silica members have become widely used as the manufacturing material for optics in such high energy laser systems.

One area of advance of such laser technology has been a move deeper into the short wavelength, high energy ultraviolet spectral region, the effect of which is an increase in the frequency (decrease in wavelength) of light produced by lasers. Of particular interest are short wavelength excimer lasers operating in the UV, deep UV (DUV), and vacuum UV (VUV) wavelength ranges. Use of such excimer laser systems is becoming popular with microlithography applications which benefit from the shortened wavelengths to increase line densities in the manufacturing of microchips. A direct physical consequence of shorter wavelengths (higher frequencies) is higher photon energies in the beam, each individual photon is of higher energy, irrespective of the total beam intensity. In such excimer laser systems, laser beam target areas of fused silica optics are exposed to high energy photon irradiation levels for prolonged periods of time resulting in the degradation of the optical properties of the optics.

It is known that such laser induced degradation adversely affects the optical properties and performance of the fused silica optics by decreasing light transmission levels, discoloring the glass, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, are susceptible to laser damage to various degrees. This variable propensity to laser damage has been attributed to low OH content, sometimes measuring as low as 10 ppm or less as determined from the value of the beta-OH. As a result, the most common suggestion has been to increase the OH content of such glass to a high level. For example, Escher, G. C., *KrF Laser Induced Color Centers In Commercial Fused Silicas,* SPIE Vol. 998, *Excimer Beam Applications,* pp. 30–37 (1988), confirms that defect generation rate is dependent upon the fused silica OH content, and that "wet" silicas are the material of choice for KrF applications. Specifically, they note that high OH content silicas are more damage resistant than low OH silicas.

U.S. Pat. No. 5,086,352 and its related U.S. Pat. No. 5,325,230 have also disclosed that the ability to resist optical deterioration from exposure to a short wavelength ultraviolet laser beam depends on the OH group content in the presence of hydrogen gas. Specifically, these references show that for high purity silica glass having low OH content, KrF excimer laser durability is poor. Thus, they suggest to have an OH content of at least 50 ppm. Similarly, Yamagata, S., *Improvement of Excimer Laser Durability of Silica Glass, Transactions* of the *Materials Research Society* of Japan, Vol. 8, pp. 82–96, 1992, discloses the effect of dissolved hydrogen on fluorescence emission behavior and the degradation of transmission under irradiation of KrF excimer laser ray for high purity silica glass containing OH groups to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., *Mechanism of Color Center Destruction in Hydrogen Impregnated Radiation Resistant Glasses, Materials Research Bull.,* Vol. 5, pp. 385–390, 1970, have disclosed that hydrogen-impregnated glasses tend to resist gamma ray-induced radiation. Japanese Patent Abstract 40-10228 discloses a process by which quartz glass article made by melting, is heated at about 400 to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950 to 1400° C. followed by heat treatment in an oxygen atmosphere at the same temperature range.

Shelby, J. E., *Radiation Effects in Hydrogen-impregnated Vitreous Silica,* J. Applied Physics, Vol. 50, No. 5, pp. 3702–06 (1979), suggests that irradiation of hydrogen-impregnated vitreous silica suppresses the formation of optical defects, but that hydrogen impregnation also results in the formation of large quantities of bound hydroxyl and hydride, and also results in the expansion or decrease in density of the glass.

Recently, U.S. Pat. No. 5,410,428 has disclosed a method of preventing induced optical degradation by a complicated combination of treatment processes and compositional manipulations of the fused silica members to achieve a particular hydrogen concentration and refractive index, in order to improve resistance to UV laser light degradation. It is suggested that under such UV irradiation the chemical bonding between silicon and oxygen in the network structure of the fused silica is generally broken and then rejoins with other structures resulting in an increased local density and an increased local refractive index of the fused silica at the target area. One approach which has been suggested to remedy this optical degradation problem it is to control and manipulate the chemical composition of the fused silica, and particularly the concentration of $H_2$ dissolved in the fused silica.

More recently, U.S. Pat. No. 5,616,159 to Araujo et al., disclosed a high purity fused silica having high resistance to optical damage up to $10^7$ pulses (350 mJ/cm$^2$) at the laser wavelength of 248 nm, and a method for making such glass.

While the above suggested methods are at least partially effective in reducing the absorption induced at 215 and 260 nm, there has been little or no suggestion for addressing optical damage caused by radiation-induced compaction resulting from prolonged exposure to eximer lasers. Thus, there continues to be a need for more improved fused silica glasses and methods for increasing their resistance to optical damage during prolonged exposure to ultraviolet laser radiation, in particular, resistance to optical damage associated with prolonged exposure to UV radiation caused by 193 and 248 nm excimer lasers. Accordingly, it is the object of the present invention to disclose a method of increasing the resistance of high purity fused silica glass to optical damage caused by laser induced compaction during use.

SUMMARY OF THE INVENTION

Briefly, it is the object of the invention to provide fused silica having a high resistance to compaction-related optical damage caused by prolonged exposure to laser radiation. In particular, the invention relates to a method of increasing the resistance of fused silica to optical damage by pre-compacting the glass by either (i) irradiating the glass with a high pulse fluence laser, (ii) subjecting the glass to a hot isostatic press operation, (iii) exposing the glass to a high energy electron beam and subsequently treating the glass in a hydrogen atmosphere to remove any absorptions at 215 and 260 nm which may have been created by the electron beam, or (iv) any other appropriate method.

By pre-compaction with "a high pulse fluence laser", we mean that the member is pre-exposed with a laser at an energy density per pulse greater than or equal to the energy density per pulse of the laser to be used in actual application, when the two lasers are operating at the same wavelength. If the member is pre-compacted with a shorter wavelength laser than the application wavelength, then a lower pulse energy density could be used for pre-compaction.

DETAILED DESCRIPTION OF THE INVENTION

Figure 1:
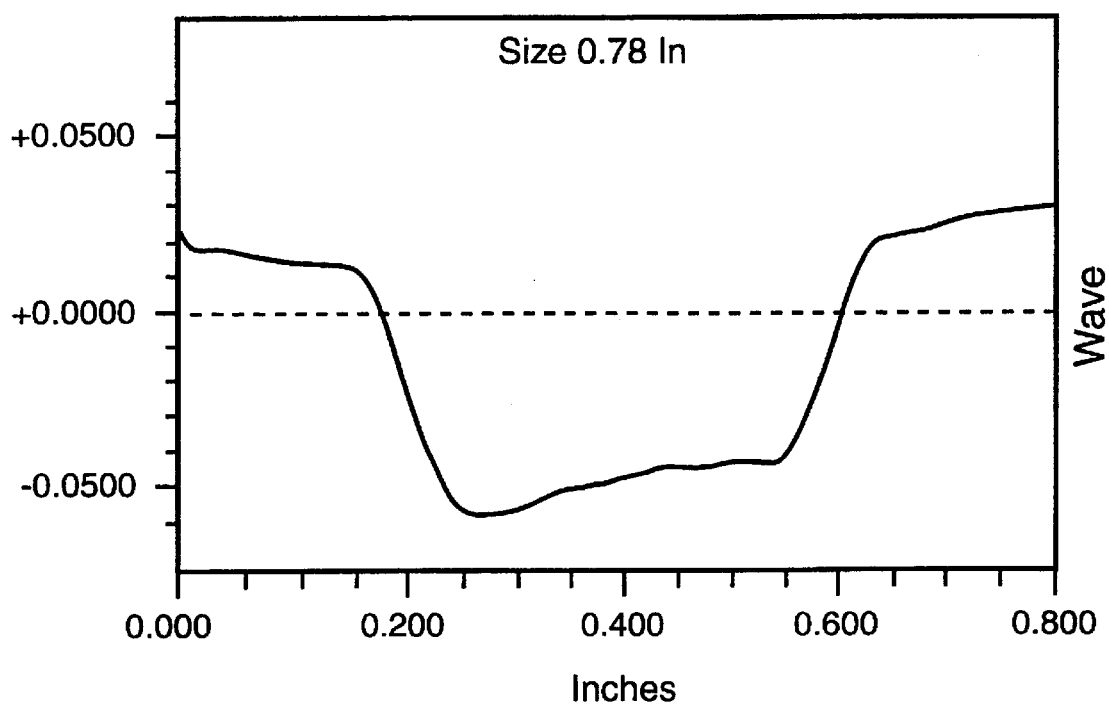
FIG. 1 is an interferometer profile of the Reference sample.

The essence of the present invention is the discovery that by pre-compacting fused silica, the glass can be desensitized to the compaction and densification that may be caused by prolonged exposure of the glass to laser irradiation during use.

Two forms of optical damage have been identified for fused silica members subjected to high energy laser radiation. The first is optical damage due to absorption, and the second is optical damage due to compaction. Prior art is replete with suggestions for ameliorating the first form of optical damage, that is damage due to absorption, and some of these are discussed briefly above in the background section. I have found that compaction-related optical damages can be ameliorated by pre-compacting the glass prior to actual use. Pre-compaction can be achieved by one of several methods including: (1) irradiating the glass with high pulse fluence laser, preferably at a shorter wavelength than the wavelength to which the glass will be exposed during use; (2) subjecting the glass to a hot isostatic press process; (3) subjecting the glass to a high energy electron beam and subsequently exposing the glass to a hydrogen atmosphere to eliminate any absorptions at 215 and 260 nm which may have been created by the electron beam. Regardless of the actual method used to achieve the pre-compaction, the aim is to pre-compact the glass and thereby desensitize the glass to future irradiation for example. One result of pre-compaction is an increase in the density of the glass. In one embodiment, the resistance to degradation is attained by increasing the density of the fused silica member by applying physical force to the glass prior to irradiation by a laser beam.

In investigating the effect of hydrogen doping on the resistance of fused silica to laser-induced optical damages, I observed that even though there is a marked increase in the optical damage resistance of hydrogen-treated glass, there remained a residual optical damage in the treated glasses after prolonged exposure to laser. Upon further investigation, I confirmed that a portion of the previously observed degradation of the fused silica optics during irradiation is actually due to a physical compaction of the fused silica which results in a localized densification of the target area of the glass. I further confirmed that this localized densification results in a physical distortion of the optical member and a change in its refractive index. In addition to the induced damages such as reduced transmission levels, increased absorption levels, and changes in refractive index, the shape and surface of the glass member undergoes physical distortion and stress as a result of the compaction of the laser beam target area. This localized densification and compaction of the fused silica glass at the laser beam target area adversely affects the shape, prescription, optical surface and other physical-optical characteristics of the optical member during prolonged exposure.

The extent to which a fused silica member will compact during use can be determined by measuring the birefringence induced in the member by the UV laser beam, or by measuring optical path differences using an interferometer between exposed and unexposed regions of the lens. Using such measurements, I have discovered that commercially available fused silica members can be desensitized (i.e., rendered resistant) to UV laser induced optical degradation by pre-compacting the member before it is used in its intended laser system.

By addressing the physical compaction caused by the UV laser beam irradiation of the fused silica member, the inventor has developed a method of treating fused silica that is not dependent upon the specific chemical composition or manufacturing history of the fused silica, thus broadening the utility of this treatment to a large group of fused silica compositions. Thus, unlike previously disclosed methods of increasing resistance to optical damage which were generally dependent upon specific treatment processes and chemical compositions, such as stria removal, $H_2$ doping, and the concentration of $H_2$ and OH in the glass, the present method can be applied to any glass regardless of these process and compositional variables. By physically pre-densifying and pre-compacting the entire fused silica member by irradiation prior to use, optionally, coupled with the application of force, the fused silica member is rendered resistant to physical distortions caused by the irradiation during use. By subjecting commercially available fused silica glass to hot isostatic pressing (HIP), the inventor has been able to improve the resistance of the fused silica to UV laser induced damage.

In another embodiment of the invention, the inventor has desensitized fused silica members to compaction by pre-compacting the fused silica members with radiation from high energy radiation sources. This method of the invention encompasses pre-compacting the fused silica member with high energy radiation such as electron beams, gamma ray beams, x-ray beams, short wavelength, high pulse fluence laser beams, and neutron beams to result in a fused silica member that is resistant to compaction.

EXAMPLES

In the following examples, fused silica samples of Corning's Code 7940 and 7980 glasses (available from Corning Incorporated, Corning, N.Y. 14831) were densified by the HIP process with pressures between 15,000 psi (103,422kPa) and 70,000 psi (482,636 kpa) and temperatures between 1,100° C. and 1,325° C. The fused silica members cut from blanks of Corning Code 7940 and 7980 were densified using a variety of HIP runs which included maintaining an elevated pressure during cooling to prevent expansion of the glass. The various HIP runs are described below:

Run A HIP for 2 hours at: 1,200° C. and 30,000 psi (206,844 kPa) of argon atmosphere, pressure held until temperature less than 800° C. [ASEA HIP unit]. Sample size of 1.25" (3.175 cm)×1.25" (3.175 cm)×1.0" (2.54 cm).

Run B HIP for 4 hours at: 1,325° C. and 15,000 psi (103,422 kPa) of argon atmosphere. [ASEA HIP unit] Sample size of 1.25" (3.175 cm)×1.25" (3.175 cm)×1.0" (2.54 cm).

Run C (Control) HIP for 2 hours at: 1,200° C. and atmospheric pressure of argon atmosphere [ASEA HIP unit]. Sample size of 1.25" (3.175 cm)×1.25" (3.175 cm)×1.0" (2.54 cm).

Run D HIP for 0.5 hour at: 1,200° C. and 70,000–75,000 psi (482,636 kPa–517,110 kPa) [MTU (Michigan Technological University) High Pressure HIP/molybdenum furnace with 8" diameter by 3.5" high chamber] and cooled at furnace rate while maintaining high pressure. Sample sizes of 1.5" (3.81 cm)×3" (7.62 cm)×0.5" (1.27 cm) (a), 1.5" (3.81 cm)×3" (7.62 cm)×0.5" (1.27 cm) (b), and 1.5" (3.81 cm)×1.5" (3.81 cm)×3" (7.62 cm) (c).

Run E HIP for 2 hours at: 60.000 psi (413,688 kPa) and 1,200° C. for 2 hours, followed by 1,085° C. for 2 hours, then cooled at furnace rate to room temperature [MTU High Pressure HIP/molybdenum furnace with 8" diameter by 3.5" high chamber]. Four samples of size 1.5" (3.81 cm)×1.5" (3.81 cm)×3" (7.62 cm) (a,b,c,d).

Run F HIP for 2 hours at: 1,200° C. and 60,000 psi (413,688 kPa) (argon atmosphere) and cooled at furnace rate while maintaining high pressure [DiversiTech HIP/molybdenum furnace with 3.3" diameter by 7" high chamber]. Four samples of size 1.5" (3.81 cm)×1.5" (3.81 cm)×3" (7.62 cm) (a,b,c,d).

Run G HIP at 30,000 psi (206,844 kPa) argon atmosphere and 1,200° C. for 2 hours, followed by 1,085° C. for 2 hours, pressure maintained until temperature less than 700° C. [ASEA HIP unit]. Sample sizes of 1.5" (3.81 cm)×1.5" (3.81 cm)×0.5" (1.27 cm) and two 3" (7.62 cm) long wedges.

Run H HIP for 2 hours at 1,300° C. and 30,000 psi (206,844 kPa) of argon atmosphere [ASEA HIP unit]. Sample sizes of 1.5" (3.81 cm)×1.5" (3.81 cm)×0.5" (1.27 cm) and two 3" (7.62 cm) long wedges.

Run I HIP for 2 hours at 1,100° C. and 30,000 psi (206,844 kPa) of argon atmosphere [ASEA HIP unit]. Sample sizes of 1.5" (3.81 cm)×1.5" (3.81 cm)×0.5 " (1.27 cm) and two 3" (7.62 cm) long wedges.

Run J HIP for 3 hours at 48,000 psi (actual pressure varied from 51,600 to 45,000 to 48,000 during the run), argon atmosphere, at 1200° C., followed by 3 hours at 1080° C. and 45,000 psi, and cooled under pressure to <900° C., [DiversiTech HIP/molybdenum furnace]. Sample size: 2.0" diameter×4.75 " high.

The density of fused silica member samples from Runs A thru J were measured using Archimedes method to determine the increase in density. The density measurements and the percentage of densification from HIP treatment is given in Table 1. The Reference sample was not hipped or heat treated. Run C, the control, was a heat treatment in the ASEA HIP unit at normal atmospheric pressure in an argon atmosphere in order to differentiate the effects of temperature and pressure in hipping fused silica.

TABLE 1

MEASURED DENSITIES (Archimedes' Method)

| HIP Experiment | HIP Pressure | Density (g/cm$^3$) | Precision (3 sigma) | % Densification |
| --- | --- | --- | --- | --- |
| Reference | No HIP | 2.2002 | 0.0006 | — |
| Run A | 30,000 psi (206,844 kPa) | 2.2197 | 0.0006 | 0.90% |
| Run B | 15,000 psi (103,422 kPa) | 2.2103 | 0.0006 | 0.45% |
| Run C Control | Atmospheric pressure (temp. only) | 2.2007 | 0.0006 | 0.04% |
| Run D | 70,000 psi (482,636 kPa) | (a) 2.2337 | 0.0004 | 1.53% |
|  |  | (b) 2.2326 | 0.0004 | 1.48% |
|  |  | (c) 2.2328 End 1 | 0.0006 | 1.48% |
|  |  | 2.2272 Center | 0.0006 | 1.24% |
|  |  | 2.2261 End 2 | 0.0005 | 1.19% |
| Run E | 60,000 psi (413,688 kPa) | (a) 2.2130 | 0.0005 | 0.59% |
|  |  | (b) 2.2092 | 0.0005 | 0.42% |
|  |  | (c) 2.2075 | 0.0005 | 0.34% |
| Run F | 60,000 psi (413,688 kPa) | (a) 2.2287 | 0.0005 | 1.30% |
|  |  | (b) 2.2290 | 0.0005 | 1.32% |
|  |  | (c) 2.2292 | 0.0005 | 1.33% |
|  |  | (d) 2.2291 | 0.0005 | 1.32% |
| Run G | 30,000 psi (206,844 kPa) | 2.2162 | 0.0005 | 0.74% |
| Run H | 30,000 psi (206,844 kPa) | 2.2195 | 0.0005 | 0.89% |
| Run I | 30,000 psi (206,844 kPa) | 2.2193 | 0.0005 | 0.88% |
| Run J | 48,000 psi (206,844 kPa) | 2.2269 | 0.0006 | 1.22% |

Table 1 shows that the density of the fused silica member increases with pressures up to 70,000 psi (482,636 kPa). Based on Table 1 the density of the fused silica member increases approximately linearly with the pressure ranges used and is essentially independent of the HIP temperature within the utilized range of 1,100° C.–1,325° C. This linear relationship of density on UHP pressure has been reported in the literature.

Samples from Runs A–C and a Reference were irradiated with one million and two million pulses of 193 nm laser light at 78 mJ/cm$^2$/pulse and 150 Hz produced by a Lambda Physik Model 220i Excimer Laser operating at the (ArF) 193 nm wavelength The laser induced compaction of these densified glass samples and normal density control and reference samples were determined by polarimeter measurements of maximum stress birefringence of the damaged laser beam target area and also by interferometer profile measurements of the optical path difference of the damaged laser beam target area.

Measurement of the laser induced compaction by stress birefringence and optical path difference profile are dependent on the sample geometry, and particularly, the ratio of the sample thickness to the laser beam diameter because the densification of the laser beam target area is restrained by the surrounding fused silica matrix.

Table 2 shows the polarimeter measurement data for samples of Runs A–C of laser induced stress birefringence which indicates the magnitude of laser induced densification. The initial birefringence and laser induced added birefringence of these samples were measured electronically and are recorded as the square root of the detector millivolt readings. The laser induced added birefringence is the increase in birefringence of the laser beam target area after irradiation by the 193 nm excimer laser. Techniques for making these quantitative measurements have been described by the inventor and his co-workers in 193-nm Excimer-Laser-Induced Densification of Fused Silica, Opt. Lett. Vol. 21, No. 24 (Dec. 15, 1996).

TABLE 2

BIREFRINGENCE LASER DAMAGE AT 193 nm

| Sample Identification | Initial Birefring. $mV^{½}$ | Number of Pulses @ 150 Hz | Birefring. $mV^{½}$ |
|---|---|---|---|
| Reference | 0.32 | 1,000,000 | 1.4 |
|  |  | 2,000,000 | 2.1 |
| Run A | 1.00 | 1,000,000 | 0.6 |
|  |  | 2,000,000 | 1.3 |
| RunB | 0.89 | 1,000,000 | 0.9 |
|  |  | 2,000,000 | 0.7 |
| Run C Control | 0.84 | 1,000,000 | 1.2 |
|  |  | 2,000,000 | 2.0 |

Interferometer profile measurements of the optical path difference of the damaged laser beam target areas were made on samples of Run A–C and the Reference sample using a Zygo Mark IV interferometer. The transmitted wavefront along the excimer laser irradiation axis and the surface reflection wavefronts of the laser beam target area were measured and recorded as phase profiles.

Figure 2:
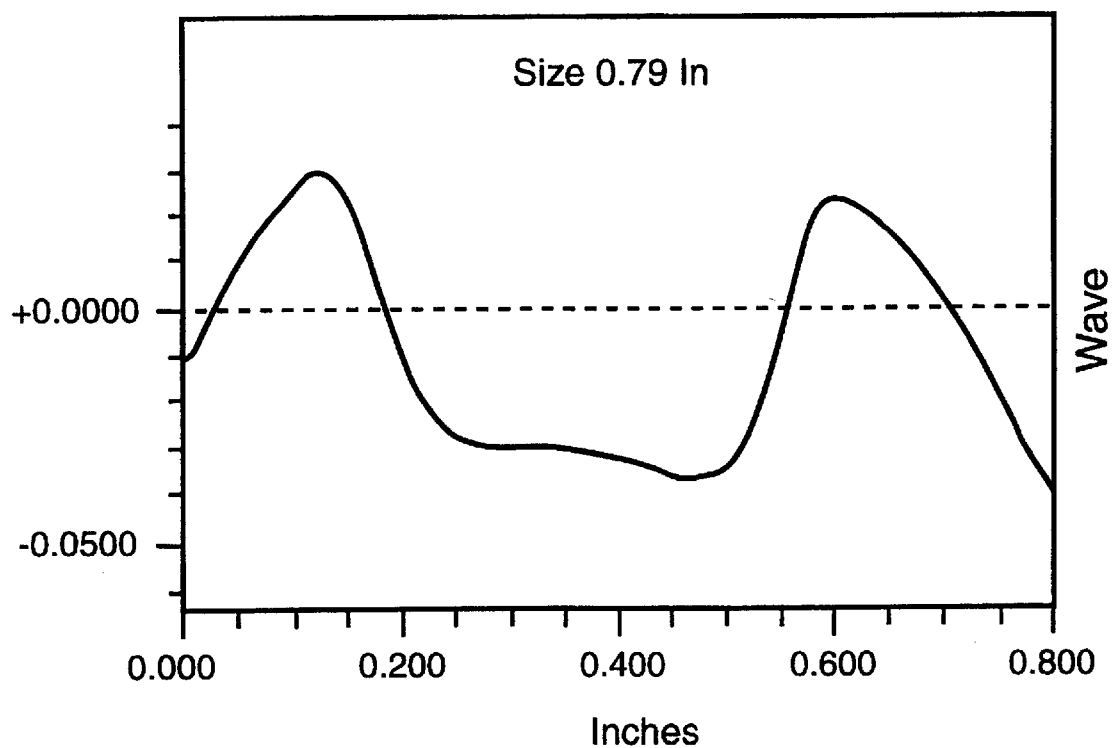
FIG. 2 is an interferometer profile of a sample from Run B.
Figure 3:
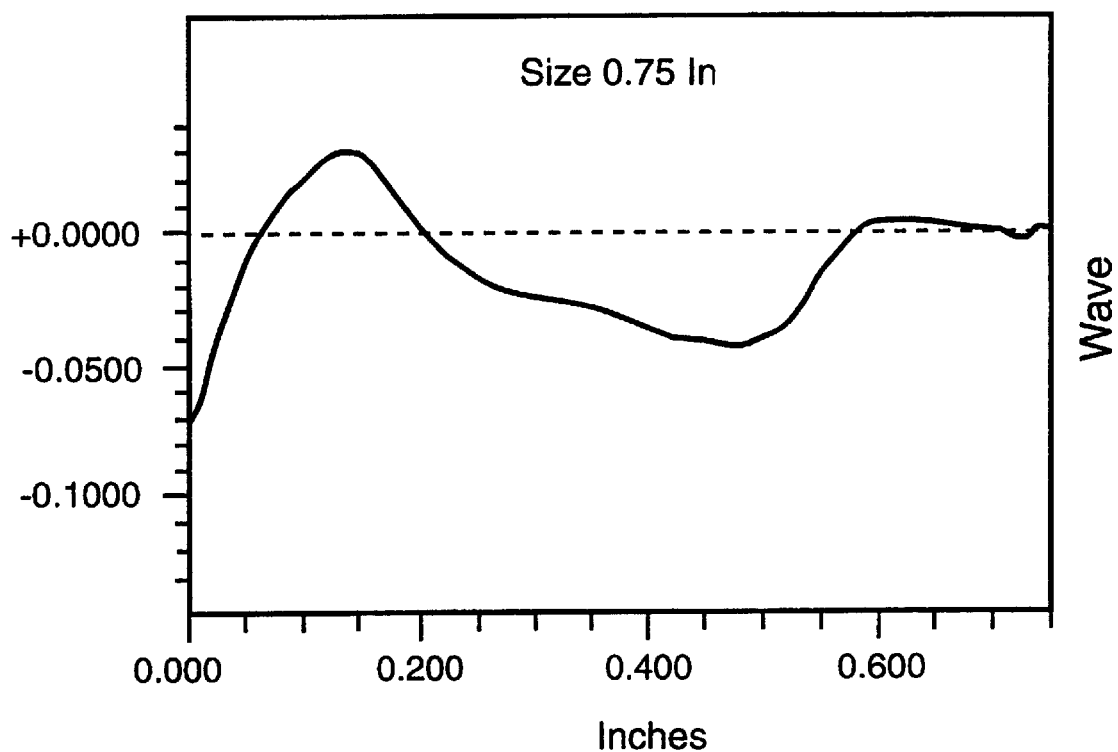
FIG. 3 is an interferometer profile of a sample from Run A.
Figure 4:
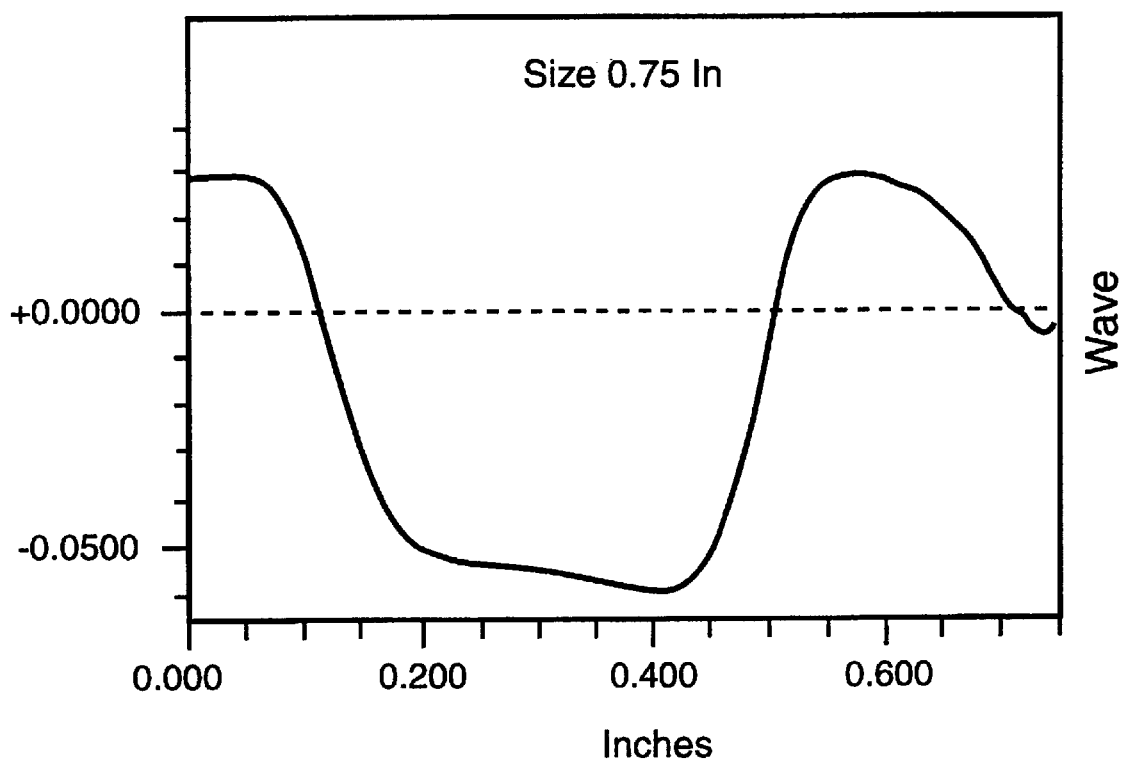
FIG. 4 is an interferometer profile of a control sample from Run C.

The transmitted wavefront phase profile of the Reference sample after irradiation by the 193 nm excimer laser is shown in FIG. 1 and clearly illustrates the compaction of the laser beam target area. The phase profile of the densified sample from Run B after irradiation by the 193 nm excimer laser is shown in FIG. 2. FIG. 3 is the phase profile of a densified sample of Run A after irradiation. FIG. 4 is the phase profile of a control sample from Run C after irradiation. These phase profiles provide a contour map of the fused silica member at the target area which discloses the physical compaction of the fused silica member's body (and surface) caused by the irradiating laser beam.

TABLE 3

| Sample Identification | Profile Height In Direction X (Number of Waves) | | Profile Height In Direction Y (Number of Waves) | |
|---|---|---|---|---|
|  | Left Edge | Right Edge | Left Edge | Right Edge |
| Reference | 0.065 | 0.075 | 0.065 | 0.095 |
| Run A | 0.045 | 0.050 | 0.045 | 0.055 |

TABLE 3-continued

| Sample Identification | Profile Height In Direction X (Number of Waves) | | Profile Height In Direction Y (Number of Waves) | |
|---|---|---|---|---|
|  | Left Edge | Right Edge | Left Edge | Right Edge |
| Run B | 0.060 | 0.065 | 0.040 | 0.060 |
| Run C Control | 0.080 | 0.090 | 0.075 | 0.085 |

The maximum to minimum profile heights for the laser damaged target areas from the interferometer phase profiles of Runs A–C and the Reference are given in Table 3 as number of waves (fraction of a 632.8 nm wavelength). The number of waves for the left and right edges of direction X were taken from FIGS. 1–4. The direction Y data was taken from the phase profile scans in the Y direction (not shown in the Figures, but perpendicular to and same plane as direction X) of the damaged target areas shown in FIGS. 1–4.

The added birefringence data of Table 2, the interferometer phase profiles of FIGS. 1–4, and the profile height data of Table 3 clearly show that the densified and pre-compacted samples from Runs A and B have an improved resistance to compaction caused by the irradiation of the 193 nm excimer laser beam. The polarimeter measured added birefringence data gives the amount of birefringence formed in the glass due to the physical distortion and compaction of the fused silica member in the laser beam target area. After one million pulses of 193 nm laser light, the Run B sample had an added birefringence of 0.9 $mV^{1/2}$ and the Run A sample had an added birefringence of 0.6 $mV^{1/2}$ which is approximately half the added birefringence of the Reference and Run C control sample, which were respectively, 1.4 and 1.2 $mV^{1/2}$. After two million laser beam pulses, the Run B sample had an added birefiingence of 0.7 $mV^{1/2}$ and the Run A sample had an added birefringence of 1.3 $mV^{1/2}$ which again is approximately half of the 2.1 $mV^{1/2}$ birefringence of the Reference sample and the 2.0 $mV^{1/2}$ birefringence of the Run C control sample. As indicated by these birefringence measurements of the laser beam target area, the densifying HIP treatment of Runs A and B rendered the fused silica resistant to laser induced compaction compared to the Reference sample and Run C control sample which were not pre-compacted.

The interferometer phase profile of the laser beam target area of the fused silica members further demonstrates the ability of the inventive method to improve the resistance of a fused silica member to laser induced compaction, densification, and distortion. The phase profile of the Reference as shown in FIG. 1 and the profile of Run C (the control sample) as shown in FIG. 4 exhibit a markedly deeper compaction compared to the profile of Run A in FIG. 3 and the profile of Run B in FIG. 2. As shown in Table 3, the profile heights from Runs B and A ranged from a minimum compaction of 0.040 number of waves to a maximum compaction of 0.065 number of waves. This is an improved resistance to compaction relative to the non-densified Reference sample and Run C control sample profile heights which ranged from a minimum compaction of 0.065 number of waves to a maximum compaction of 0.095 number of waves.

Figure 5:
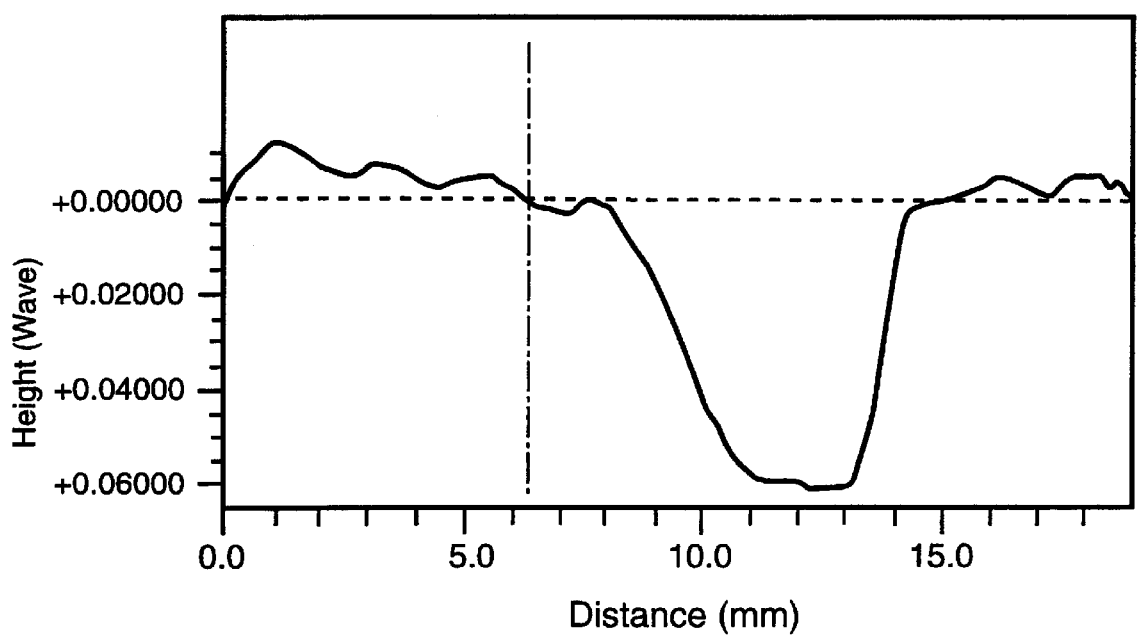
FIG. 5 is an interferometer profile of a sample from Run J.

In one experiment, a sample of the glass from Run J and a matching glass sample not subjected to the HIP process taken from an immediately adjacent position in the boule, were polished to 1 cm×1.5 cm×2 cm size and exposed to a 193 nm excimer laser, through central regions of the samples, at a pulse fluence of 25 mJ/cm²/pulse. Interferometer measurements of the optical path difference (OPD) phase profile were made at intervals of about 10 million pulses of exposure. The profile of the sample from Run J is shown in FIG. 5.

Figure 6:
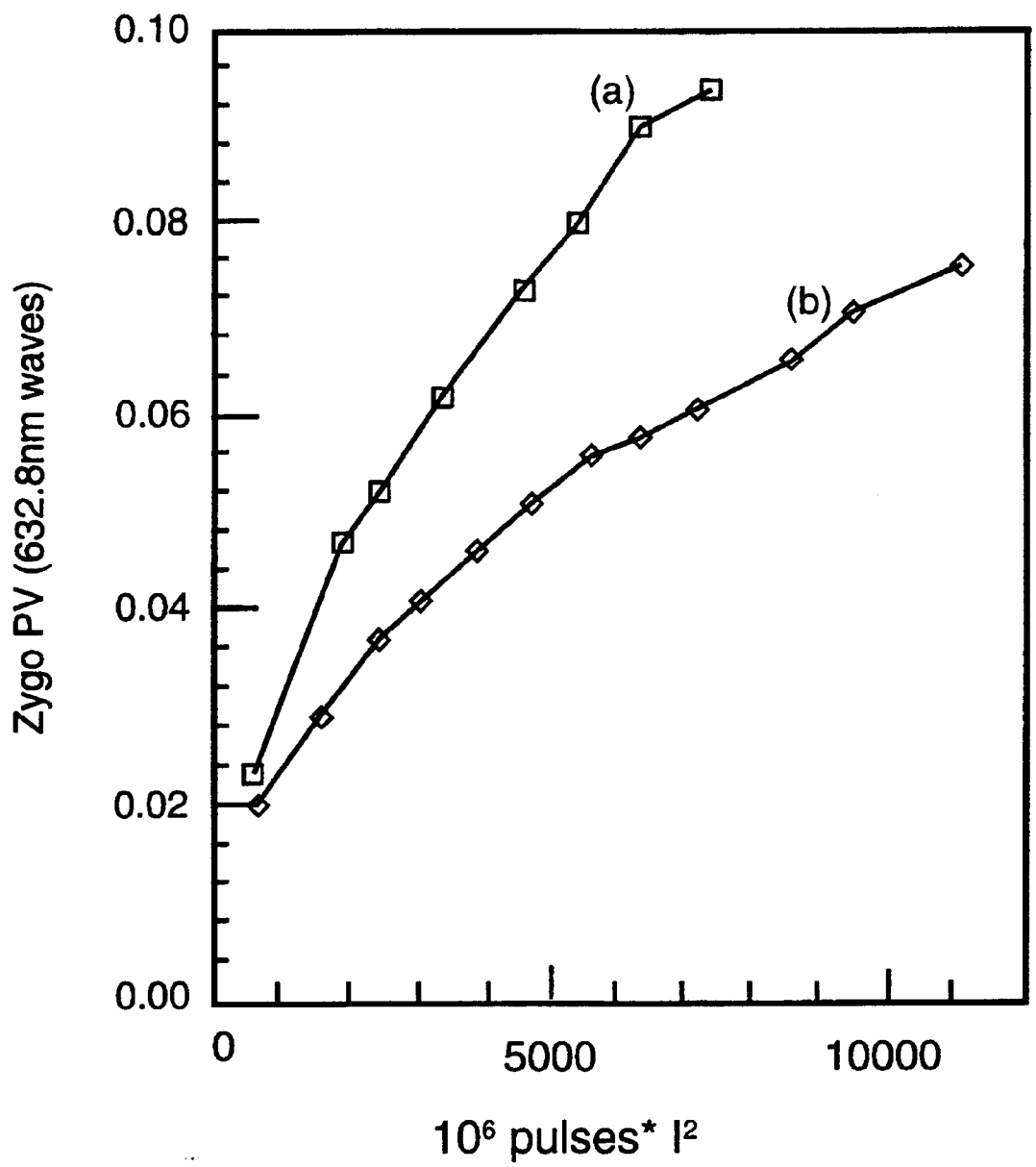
FIG. 6 is a graph of peak-to-valley optical path differences (in number of waves at 632 nm) versus number of laser pulses times square of the pulse fluence, as measured on an interferometer comparing a precompacted glass to a non-precompacted glass.

After 11 million pulses ($I^2N$=6,875) the peak-to-valley (PV) of the pre-compacted (b) and non-compacted samples (a) as a function of the dose (the pulse-fluence squared times number of pulses, $I^2N$) are given in FIG. 6. The PV for the pre-compacted sample (b) after 11 million pulses is only 0.061 waves, compared to 0.094 waves for the non-pre-compacted sample (a) after 11.25 million pulses ($I^2N$=7,031).

This inventive method of rendering a commercially available fused silica member resistant to physical distortion, compaction, and densification during use, is achieved by physically pre-compacting and pre-densifying the entire fused silica member prior to such use. In one embodiment, by subjecting the glass to a HIP process, the density is increased from 2.20 g/cm$^3$ to 2.21 g/cm$^3$ or greater thereby desensitizing the fused silica to further compaction and densification.

The preferred method of this invention is to pre-compact the fused silica member with a high pulse fluence short wavelength (high frequency) laser beam. With this method, the fused silica member is irradiated with a high energy laser beam having a fluence level (mJ/cm$^2$/pulse) greater than the fluence level that the fused silica member will be exposed to in its intended use, such as a stepper lens in a microlithography laser system.

Figure 7:
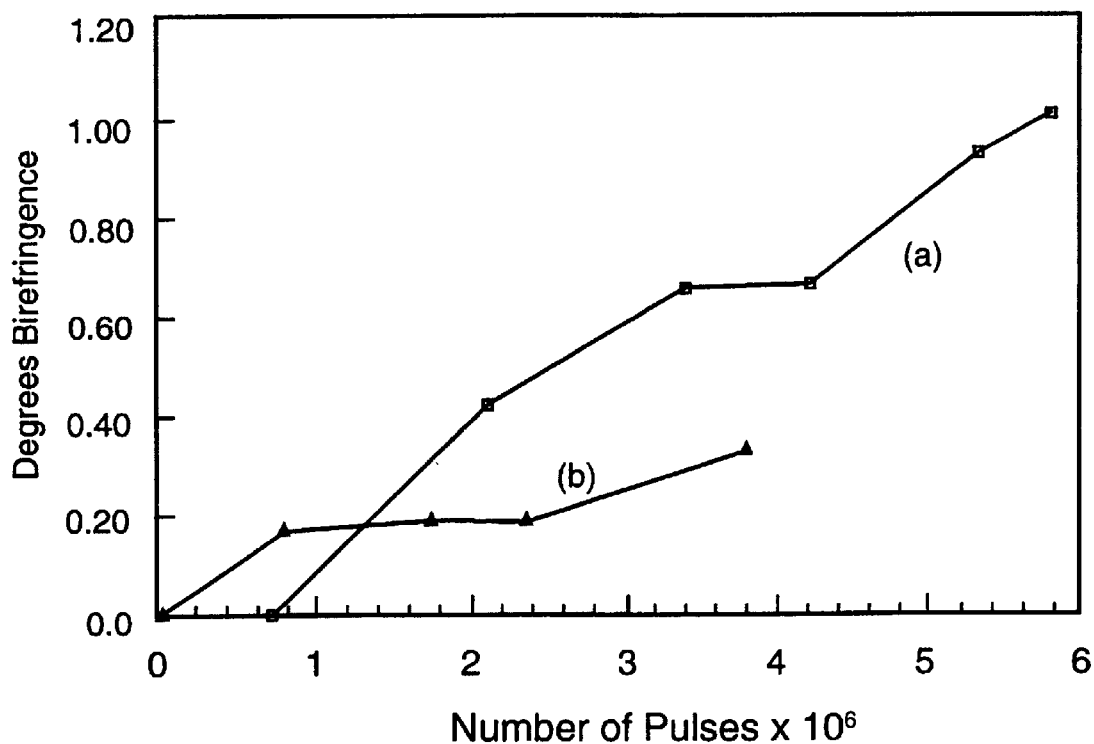
FIG. 7 is a graph induced birefringence versus number of laser pulses comparing a pre-compacted glass to a non-compacted glass.

FIG. 7 discloses the beneficial results of this method of pre-compacting fused silica with a high pulse fluence laser beam to produce a fused silica member resistant to compaction induced by a low pulse fluence laser beam. In this test matching fused silica members of Corning Code 7980 which were extracted from corresponding regions of a fused silica boule were exposed to a low pulse fluence 193 nm laser beam and the degrees of induced birefringence were measured to determine the level of compaction. With this test a fused silica member was pre-compacted with a high pulse fluence 193 nm laser beam at 26 mJ/cm$^2$/pulse for 6×10$^6$ pulses and 46 mJ/cm$^2$/pulse for 4×10$^6$ pulses. This pre-compacted sample and the control sample, which was not pre-compacted, were exposed to several million pulses of low pulse fluence 193 nm laser beam radiation at 17 mJ/cm$^2$/pulse. The results are reported in FIG. 5 as degrees of birefringence measured on a polarimeter at 633 nm wavelength.

Birefringence measurements of the samples were made throughout these exposures of several million pulses to allow comparison of the samples' resistance to lower fluence induced compaction. As shown in FIG. 7, the pre-compacted sample (b) showed an improved resistance to compaction compared to the non-precompacted sample (a). The pre-compacted fused silica member (b) is thus desensitized to laser induced compaction that would otherwise result when said member is utilized in its ultimately intended application, particularly when such intended application is at a lower pulse fluence laser than the fluence used for pre-compaction.

Figure 8:
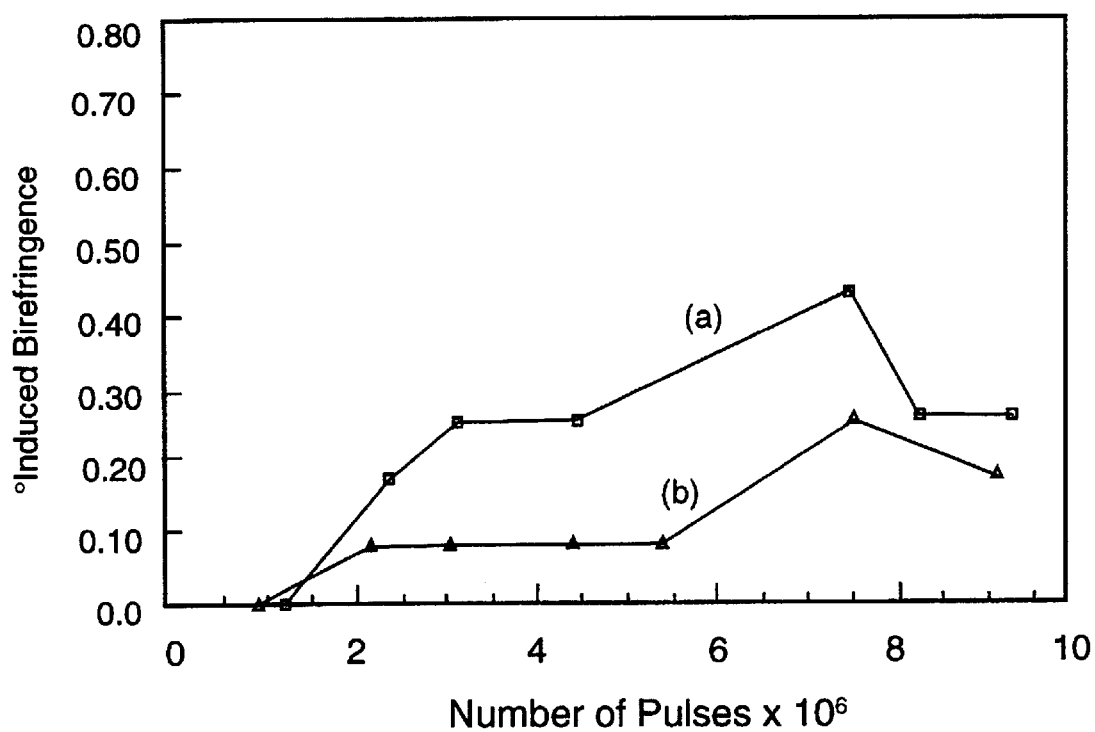
FIG. 8 is a graph of induced birefringence versus number of laser pulses comparing a pre-compacted glass to a non-compacted glass.

FIG. 8 discloses the beneficial results of this method of pre-compacting fused silica having a lower OH level than the glass of FIG. 7. With this test a fused silica member was exposed to a 193 mn laser beam at 13 mJ/cm$^2$ for 12×10$^6$ pulses and then pre-compacted with a high fluence 193 nm laser beam at 26 mJ/cm$^2$ for 11×10$^6$ pulses. This pre-compacted sample (b) and the control sample (a), which was not pre-compacted, were exposed to several million pulses of low fluence 193 nm laser beam radiation at 15 mJ/cm$^2$. As shown in FIG. 8, the pre-compacted sample showed an improved resistance to compaction as measured by degrees of induced birefringence.

An additional embodiment of the invention is to pre-compact the fused silica member with a high energy electron beam. With this method the fused silica member is irradiated with a high energy electron beam and then treated in a hydrogen atmosphere to remove the strong absorption at 215 nm and 260 nm that is created by the electron irradiation.

Figure 9:
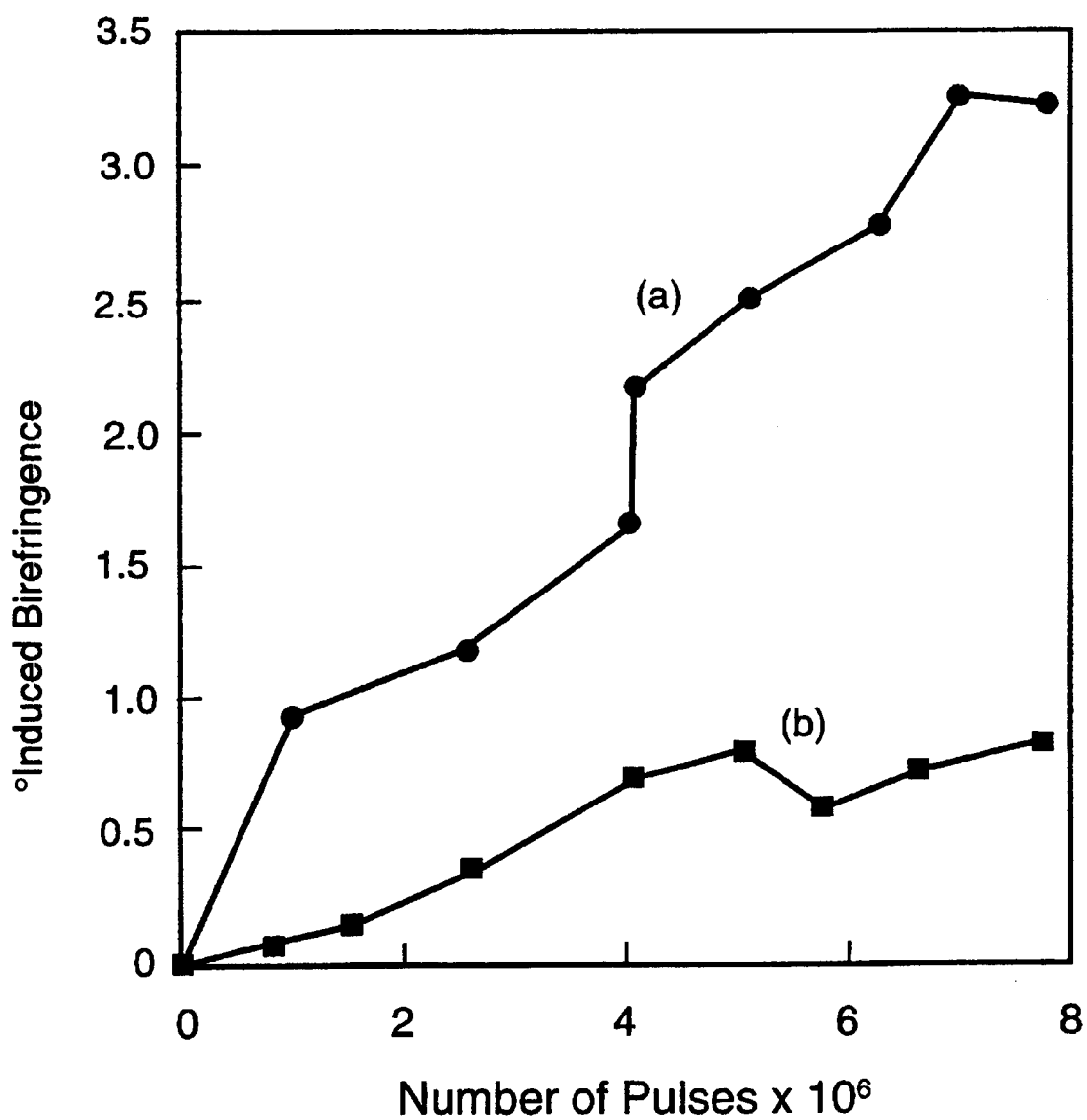
FIG. 9 is a graph of induced birefringence versus number of laser pulses, given in millions ($\times 10^6$) comparing a pre-compacted glass to a non-compacted glass.

FIG. 9 discloses the beneficial results of this electron beam pre-compaction. In this test matching fused silica members of Corning Code 7940 were exposed to 193 nm laser beam and the birefringence of the member minus its initial birefringence was measured. With this test a fused silica member was pre-compacted with 200 megarads of 10 MeV electrons from an electron beam. This fused silica member developed strong absorption at 215 nm and 260 nm which was removed by treating the pre-compacted member with 100 atmospheres of hydrogen gas at 350° C. for 25 days. This pre-compacted and treated member of fused silica and a control sample of fused silica from the same region of the fused silica boule were exposed to several million pulses of a 193 excimer laser beam at a fluence of 25 mJ/cm$^2$/pulse. The compaction induced by this laser irradiation was monitored by measuring the stress birefringence developed at the laser beam target area.

As shown in FIG. 9, the pre-compacted sample (b) showed an improved resistance to compaction when compared to the non-precompacted sample (a), as measured by induced birefringence expressed in degrees. The electron pre-compacted fused silica densified about a factor of three less than the control sample. During laser exposure, the pre-compacted member darkened somewhat at 215 nm, but the transmission at 215 nm recovered rapidly when the laser was turned off.

Other high energy radiation such as gamma rays, x-rays, and neutrons may be used to pre-compact fused silica to desensitize it to compaction caused by an extended exposure to UV excimer laser irradiation, such as when the fused silica is utilized in a microlithography laser illumination system.

The pre-compaction methods of the invention are believed to be most effective when a larger percentage of the fused silica member is pre-compacted compared to the percentage of the fused silica member that is exposed for extended periods of time in the intended UV laser system. It is preferred that the entire fused silica member is pre-compacted by flooding with high energy radiation.

The pre-compaction method of the invention utilizing the high pulse fluence 193 nm laser beam irradiation is particularly effective in desensitizing the fused silica member to compaction induced by a longer wavelength laser beam, such as that produced by a 248 nm excimer laser since the photon energies are greater at 193 nm than at 248 nm.

The essential character of this invention can easily be ascertained from the foregoing by one skilled in the art, and such person can make various changes and modifications to the invention without departing from the intended spirit and scope.

What is claimed is:

1. A method of increasing the resistance of a fused silica member to laser-induced optical damage with a target area of the member exposed to a high pulse fluence laser during use, said method including pre-compacting the member by flooding an area of the member with a high energy radiation laser beam wherein the area flooded is larger than the target area.

2. The method of claim 1, wherein the pulse fluence of the high energy radiation laser used to pre-compact the member is greater than the pulse fluence of the laser during use.

3. The method of claim 1, wherein the wavelength of the pre-compaction high energy radiation laser is shorter than the wavelength of the laser to which the member will be subjected during use.

4. A method of increasing the resistance of a fused silica member to laser-induced optical damage by pre-compacting the member, said method including flooding an area of the member with a high energy radiation electron beam having an energy greater than 4 MeV.

5. A method of increasing the resistance of a fused silica member to laser-induced optical damage by pre-compacting the member, said method including hot isostatic pressing said fused silica member wherein the density of said fused silica member is increased by 0.1–3%.

6. A method of increasing the resistance of a fused silica member to laser-induced optical damage by pre-compacting the member, said method including flooding an area of the member with a high energy radiation in order to densify the member wherein the density of the member is increased by 10 to 100 ppm.

7. A method of making a fused silica member for use with a UV laser beam, said fused silica member having a target area exposed to said UV laser beam during use, said method including providing a fused silica member and, prior to using said fused silica member target area with said UV laser beam, flooding a large area of said fused silica with a high energy laser radiation wherein said laser radiation flooded large area is larger than said target area exposed to said UV laser beam during use.

8. A method as claimed in claim 7, wherein flooding includes entirely flooding said fused silica member.

* * * * *